United States Patent [19]

Schulze

[11] Patent Number: 4,878,052
[45] Date of Patent: Oct. 31, 1989

[54] HAND-HELD TRANSMITTER FOR THE EMISSION OF CODED ELECTROMAGNETIC PULSES, AND A RECEIVER FOR RECEIVING PULSES EMITTED BY THE TRANSMITTER

[75] Inventor: Matthias Schulze, Weiterstadt, Fed. Rep. of Germany

[73] Assignee: Alltronik Gesellschaft Fur Elektronische Steuerung und Antriebe mbH, Weiterstadt, Fed. Rep. of Germany

[21] Appl. No.: 152,883

[22] Filed: Feb. 5, 1988

[30] Foreign Application Priority Data

Dec. 5, 1987 [DE] Fed. Rep. of Germany ....... 3741324

[51] Int. Cl.$^4$ .............................................. H04B 1/02
[52] U.S. Cl. ..................... 340/825.690; 340/825.320; 340/825.57; 341/176; 455/91
[58] Field of Search ...................... 340/825.69, 825.72, 340/825.71, 825.57, 825.62; 375/22, 23; 455/114, 63, 119–121, 353, 352, 355, 91; 341/176

[56] References Cited

U.S. PATENT DOCUMENTS

| | | | |
|---|---|---|---|
| 3,854,094 | 12/1974 | Towler | 455/91 |
| 4,063,410 | 12/1977 | Welling | 455/91 |
| 4,485,382 | 11/1984 | Moore | 340/825.69 |
| 4,590,471 | 5/1986 | Pieroway et al. | 340/825.69 |
| 4,771,440 | 9/1988 | Fromm | 375/22 |

*Primary Examiner*—Donald J. Yusko
*Assistant Examiner*—E. O. Rudpod
*Attorney, Agent, or Firm*—Baker, Maxham, Jester & Meador

[57] ABSTRACT

The invention relates to a hand-held transmitter and a receiver tuned to it, e.g. for remote control of garage doors, the transmitter consisting of a current/voltage supply (100), a coding unit (200) generating coded electromagnetic pulses and with an adjustable code, a pulse shaper (300), an HF oscillator (400), an HF output stage (500), a filter (600) and an antenna (700). In order to simplify the construction of such a transmitter, it is suggested according to the invention that the oscillator (400) comprise a circuit which enables a reliable oscillation build-up pattern in a relatively wide range of frequencies around the rated frequency and that the filter (600) connected between the output stage (500) and the antenna (700) be a steeply flanked low-pass filter.

24 Claims, 5 Drawing Sheets

HAND-HELD TRANSMITTER FOR THE EMISSION OF CODED ELECTROMAGNETIC PULSES, AND A RECEIVER FOR RECEIVING PULSES EMITTED BY THE TRANSMITTER

BACKGROUND OF THE INVENTION

The present invention relates to a hand-held transmitter for emitting coded electromagnetic pulses to a receiver for receiving pulses emitted by the transmitter, and to a method of coding electromagnetic pulses. The transmitter may comprise a current/voltage supply, a coded pulse generating coding unit with an adjustable code, a pulse shaper, and HF oscillator, an HF output stage, a filter and an antenna.

The associated receiver for receiving coded electromagnetic pulses may comprise a current/voltage supply, an antenna, an integrated receiver comprising HF and IF amplifier stages and a mixer for intermediate frequency generation, a demodulator, a signal amplitude regulating system, a decoding unit with a code-selector circuit and an input/output circuit (interface).

A transmitter-receiver system consisting of such a transmitter and an associated receiver can be used for the remote operation of various items of equipment. Preferably, such transmitter-receiver systems are used for the remote controller operation of garage doors or entrance gates, the transmitter being carried in the car and operated by the driver or passenger. In such a case, only a few functions are generally required, for example one switch or button for "open" and one for "close".

When the transmitter is operated, e.g. by pressing a button marked "open", the transmitter emits a sequence of electromagnetic pulses which corresponds essentially to a binary code number, one of the bits emitted in the form of electromagnetic pulses corresponding to the desired function, in other words, in the selected example, the opening of the garage door. The other bits (for example 10) can be individually set at the transmitter, the associated receiver comprising a decoding unit with an analogue bit adjustment facility, the setting having to coincide with that of the transmitter, when the desired function (e.g. "open" or "close") is to be triggered. Therefore the receiver converts the sequence of electromagnetic pulses emitted by the transmitter into binary numbers, relates (at least) one of the bits to a specific function and compares the other bits which form, so to speak, a code word with the bit setting of the decoding unit. Only if the emitted binary code word coincides with the code word to which the decoding unit is set will the desired function by triggered.

Such a binary code word can be represented as a specific sequence of the digits 0 and 1. Since the transmitter and receiver have to have the same code word, the probability that—to stay with the example of the garage doors—when a transmitter is operated in front of the garage door, the associated receiver will also simultaneously open or, as the case may be, close one or even more garage doors at neighbours' houses and possibly still within the range of the transmitter, is avoided. A hitherto constructed transmitterreceiver system comprises a code word with a word length of 12 bits, producing a total of some 4096 different possible code settings. This system can likewise co-operate with equipment according to the present invention.

A filter and a pulse shaper are necessary components of the transmitter, in order to avoid the transmitter sending out interference pulses and in order to restrict the required HF band width, which would make it impossible to obtain regulatory agency approval necessary for operating the transmitter.

It goes without saying that a receiver can receive and convert transmitted pulses from a plurality of transmitters so long as the latter only emit the corresponding coded sequence of pulses. As garage and entrances are often used by a number of different persons, therefore, each of these persons can carry his own transmitter with him in the car or in his pocket and use the transmitter to operate the gate or garage door. This is particularly true in the case of relatively large garage installations or underground garages which are jointly used by a number of local residents. If the transmitter is to be carried not only in the car but, for example, also in the hand or in a jacket or trouser pocket comfortably, then it is very important for it to be of small overall size and to be of low weight. Hitherto, only a relatively small number of installations intended for the purpose have been equipped with corresponding receivers and transmitters. In addition to reducing the size of the transmitter, therefore, it is also desirable to simplify the constrcution of receiver and transmitter and to reduce manufacturing costs. This has not as yet been possible, however, with the hitherto known transmitter-receiver system to any adequate degree.

Therefore, the present invention is based on the problem of providing a transmitter and a receiver having the features mentioned at the outset, but which can be more economically produced and to smaller dimensions, the functional reliability of the past being at least retained but being, as far as possible, enhanced.

SUMMARY OF THE INVENTION

In accordance with one aspect of this invention, there is provided a hand-held transmitter for emiting coded electromagnetic pulses for reception and processing by a receiver tuned to said transmitter, preferably for the remote operation of garage doors, the transmitter comprising:
(a) a current/voltage supply,
(b) a coded pulse generating coding unit with an adjustable code,
(c) a pulse shaper
(d) an HF oscillator,
(e) an HF output stage
(f) a filter, and
(g) an antenna, wherein the HF oscillator comprises a circuit which enables a reliable oscillation build-up pattern in a relatively wide range of frequencies around the rated frequency, and the filter is connected between the output stage and the antenna and is a steeply-flanked low-pass filter.

With regard to the transmitter, this problem is resolved in that a readily resonating low-harmonic oscillator is used and in that the filter connected between the output stage and the antenna is a steeply-flanked low-pass filter.

In principle, the corresponding circuitry will be familiar to one skilled in the art, particularly since the invention sets out to provide simple (and low price) circuits. By reason of the fact that the oscillator enables a reliable oscillation build-up pattern in a relatively wide range of frequencies around the rated frequency, it is in fact possible nominally to dispense with the hitherto necessary trimming of the oscillator. Also, the steeply-flanked low-pass filter connected between the output stage and the antenna, in contrast to the bandpass filter previously used at this location, requires no trimming. Simply and solely the high quality antenna or antenna oscillator circuit still requires to be trimmed, so that maximum output performance is achieved. In contrast, in the case of the prior art transmitter, it was necessary to trim three different components, namely the oscillator circuit, the band-pass filter and the antenna in order to achieve maximum output performance. Such trimming can only be carried out by one skilled in the art and takes a considerable length of time, with the corresponding effect on the cost factor.

The features according to the invention, therefore, firstly simplify the construction of the transmitter in that trimming means are required neither in the oscillator nor in the filter, while on the other hand manufacturing costs are saved in that the work of trimming is reduced since only the antenna requires to be adjusted for maximum output.

According to the invention, where the oscillator is concerned, it is regarded as entirely adequate for the oscillator to be operable in the range from ±10% of the rated frequency. In such a case, relatively low cost components can, in fact, be used, and these exhibit relatively wide manufacturing tolerances. Despite these manufacturing tolerances, then, the transmitter is still fully functional.

To be specific, the desired properties of the oscillator are realised in that a modified Pierce oscillator circuit for harmonic mode crystals was used. The modifications refer on the one hand to the construction involving less outlay on components and on the other the operating point setting of the transistor with regard to component tolerances and low-harmonic oscillations.

The frequency at which the transmitter operates is preferably in the range between 20 and 50 MHz. Particularly preferable are frequencies in the 27 MHz and 40 MHz band. In this frequency range, the electromagnetic waves generated can still readily penetrate the body work of conventional private cars and even steel reinforced concrete, so that the transmitter can without problem be operated from within a motor vehicle.

Simplification of the circuitry is further contributed to by a measure whereby the antenna coil is connected via a tapping partly as an exciter coil. This makes it possible to dispense with a separate exciter coil. The antenna is trimmed at a trimming capacitor.

According to the illustrated example of the invention, the location of the tapping is at L123 and also the value of the coupling capacitor C130 is chosen from the point of view of optimum adaptation to the precedent low-pass filter.

Furthermore, the circuitry according to the illustrated example is characterised in that the output from the trapezoidal pulse shaper (Miller integrator) is connected directly to the low potential side of the output stage transistor. This simple measure provides for a higher output compared with the prior art circuit.

The flank steepness of the low-pass filter is at least 60 dB to the first harmonic. The preferred circuit arrangement of the low-pass filter is known by the term "low-pass according to Cauer parameters".

In the illustrated example, a so-called microprocessor with a selectable code bit number of 12 or 22 is provided at the coding unit.

For setting the code number, a diode matrix circuit is provided. Furthermore, a solder bridge is provided by which the coding unit can optionally be used with the normal 12 bits known from the prior art transmitter or receiver or in a mode of operation employing 22 bits. Advantageously, the new transmitter can be used not only in conjunction with the associated new receivers but also with previously used receivers.

In the illustrated example, there are in the coding unit 4 bits for various functions (commands) which have to be performed and which can be selected via a coding bridge connected to the coding unit. In this way, it is possible to pass up to 16 different functions to the receiver so that the transmitter-receiver system can be used not only for opening and closing garage doors, but can also perform a number of other functions which can also advantageously be used for the remote control of other appliances. In the case of the coding unit according to the invention, there are still more bits available to represent the code word or code number, the functional reliability of the system being further enhanced in respect of the prior art system since the unintentional triggering of "foreign" appliances becomes increasingly less probable with the increasing length of the code word.

It has been found to be particularly advantageous that the individual component elements are mounted on a wafer employing SMT. This surface mounted technology permits substantial miniaturisation of the transmitter and receiver construction and is also a favourable factor where the manufacturing costs are concerned.

In accordance with another aspect of the invention, there is provided a receiver for receiving coded electromagnetic pulses comprising:
(a) a current/voltage supply,
(b) a high frequency receiver part including:
(1) An HF input circuit, e.g. an antenna circuit,
(2) an HF/IF amplifier and mixer part,
(3) an HF oscillator,
(4) a demodulator,
(5) a signal amplitude control circuit and level converter,
(c) a decoding unit with a code selector curcuit, and
(d) an interface, e.g. an input/output circuit, wherein the oscillator of the receiver part resonates in a wide frequency range and comprises a circuit which enables a reliable oscillation build-up pattern in a relatively wide range of frequencies around the rated frequency, and wherein the antenna is associated with an oscillator circuit which has a trimming capacitor, and wherein the incoming signal is output through a capacitive divider, the divider being taken to earth on the HF side via a capacitor.

The problem on which the invention is based is with regard to the receiver and is resolved in that the IF (intermediate frequency) mixer part has a reliably resonating oscillator which has substantially the same construction as the oscillator in the associated hand-held transmitter, the coupling oscillator circuit of the antenna having a trimming capacitor and the antenna oscillating circuit having a capacitive divider for transmitting signals to the integrated receiver (I4).

The oscillator has already been described in detail in connection with the transmitter and its use in the receiver leads substantially to the same advantageous results as in the case of the transmitter since, namely, trimming is once again necessary only at the input antenna. The capacitive divider at the output of the antenna further helps to simplify the circuitry since in the past a repeater constructed from coils was used at this point.

It is true that the IF mixer (intermediate frequency mixer) provided in the integrated receiver circuit also has an internal oscillator, but in comparison with the use of an additional external oscillator, as provided according to the invention, its use proved to be disadvantageous since some parameters of the internal oscillator cannot be influenced and therefore it cannot be reliably operated without trimming.

Furthermore, there is connected in the IF amplifier part, between the single output from the IF mixer and the demodulator, a lower quality filter which renders corrections unnecessary here, also, in spite of the anticipated component tolerances.

To adjust the working point of the IF mixer and to emit signals, there is according to the invention a resistor which is connected between the mixer output and a ceramic IF filter. This, too, constitutes a simplification in comparison with the known circuit which provided an oscillator circuit at this point.

In analogy with the transmitter, the receiver according to the invention has at its decoding unit a microprocessor with an adjustable code. Also the decoding unit has a diode matrix circuit for adjusting the code word or code number. A possibility of switching over to the 12 bit system is readily available, but in the case of the new receiver it is unnecessary since, when installing a new receiver, also the associated transmitters are available with the preferably fully utilised capacity of 22 bits.

The microprocessor in the decoding unit is, according to the invention, connected to a reset circuit. Such a reset circuit is known in specialist circles by the term "Watch Dog" and serves to restore the decoding unit to a normal operating condition in the even of interference pulses being picked up at random or even in the case of a programming error.

In the case of the receiver according to the invention, the decoding unit is followed by an input/output circuit which is constructed as an adapted circuit and which, as a function of internal switch positions, may optionally have an alternating current, a direct current or a potential-free switching output. These various outputs correspond to the systems of garage door drives available on the market so that by converting internal solder bridges in the adapter circuit, one and the same receiver can be used for operating all currently known garage door drive control arrangements and other applications, such as, for example, a remotely-operated door opener (door buzzer).

Furthermore, the output circuit comprises a series of various protective circuits intended to guarantee high operational reliability in the receiver. These include an undervoltage recognition circuit, a power-onreset circuit and also a voltage limiting and reverse polarity protection circuit.

Similarly to the associated transmitter, also the receiver is produced using SMD technology. By virtue of the very short and low-inductance connections between the various component elements, the transmitters and receivers produced using SMD technology come very close to their theoretical ideal, corresponding to their circuitry.

In accordance with yet another aspect of this invention, there is provided a method of coding electromagnetic transmission pulses wherein, by time-based tripartition of the bit information of the transmitted code (pulse telegram), the proposition ensues concerning logical significance according to the following precept, so that after a flank drop from "H" to "L" and a subsequent flank rise from "L" to "H", a logic "0" is transmitted after one-third of the transmission time preset for one bit, but in the event of a subsequent flank rise from "L" to "H", a logic "1" is transmitted after two-thirds of the transmission time preset for one bit, and which is characterised in that a pulse telegram is used which is 26 bits long, comprising a 22 bit long information part followed by a synchronisation pause which is 4 bits long, consisting of a "L" signal and a flank transition from "L" to "H" after the second third of the fourth pause bit.

This method makes it possible to use the previously described transmitter and the associated receiver and so contributes to the simplified circuitry while at the same time enhacing functional reliability.

Further advantages, features and possible applications of the present invention will become evident from the ensuing description of the drawings which show a preferred embodiment of the transmitter of the associated receiver.

DETAILED DESCRIPTION

Figure 1:
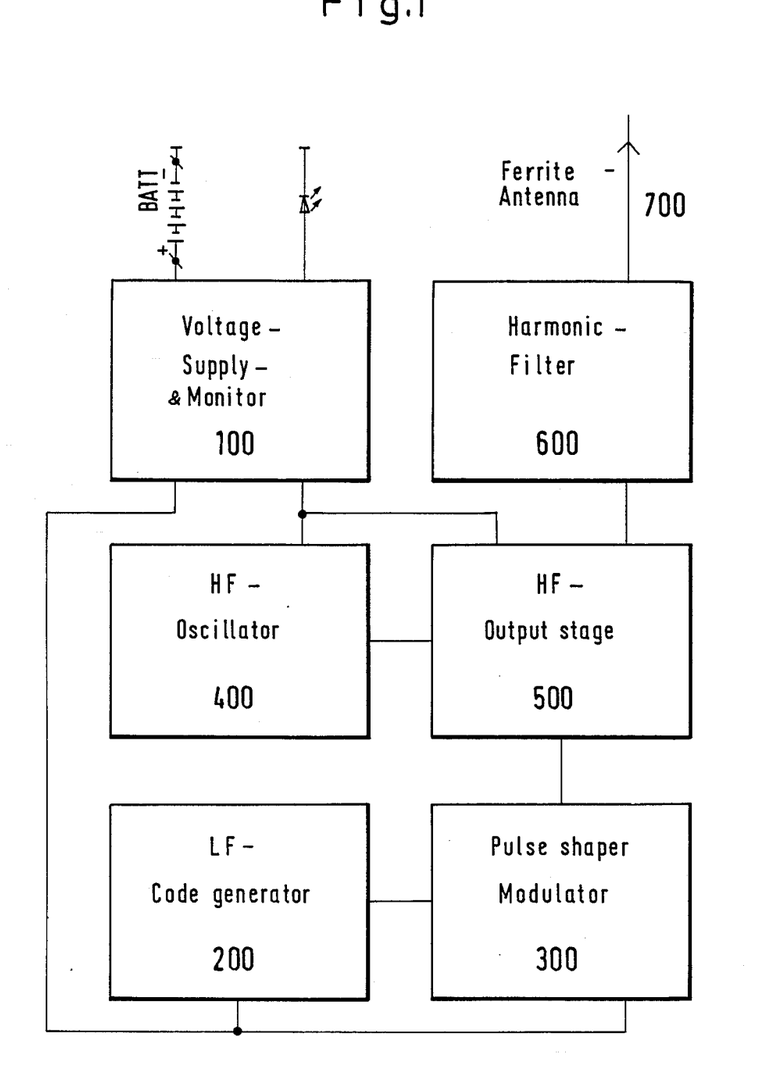
FIG. 1 is a block diagram of the transmitter.

According to FIG. 1, the transmitter consists of a voltage supply, an LF (low frequency) pulse generator, a pulse shaper, an HF (high frequency) oscillator, an HF output stage, a harmonic filter and a ferrite antenna. The voltage supply delivers a non-stabilised (battery) voltage Uu and a stabilised voltage Vcc.

Figure 2:
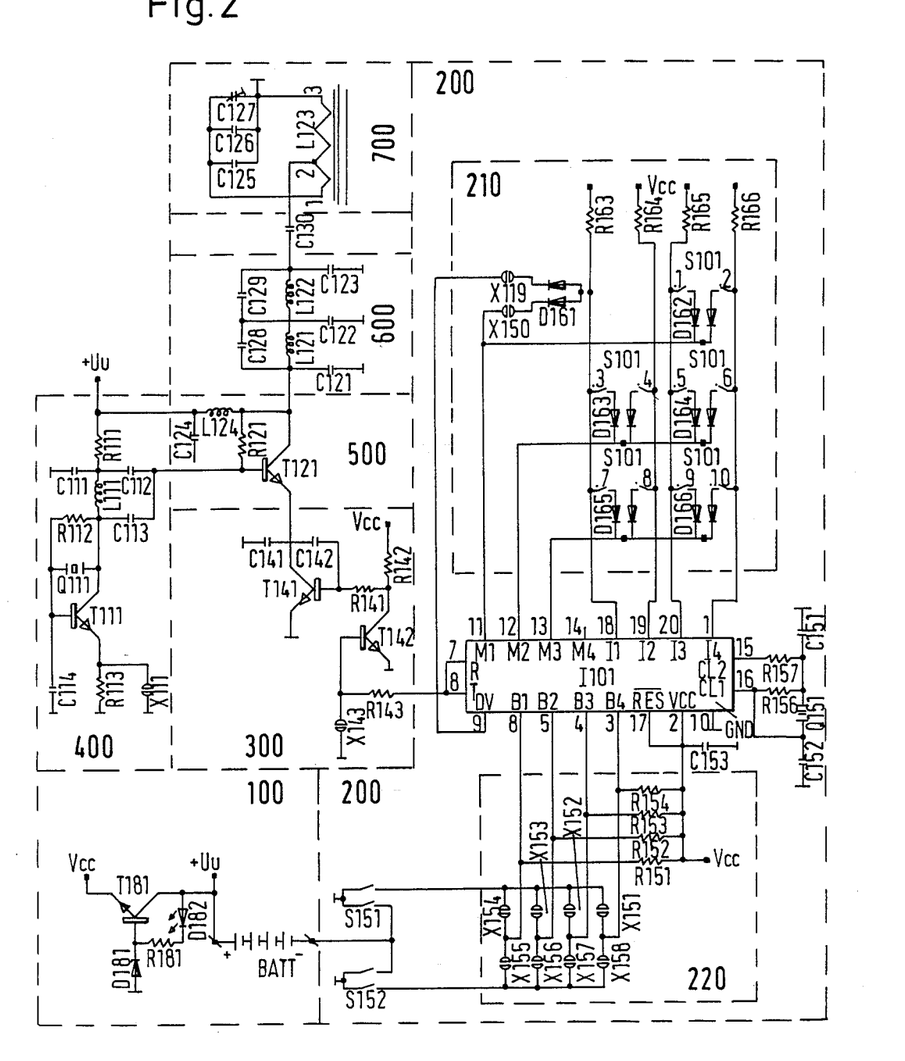
FIG. 2 is a circuit diagram of the transmitter.

As FIG. 2 shows, the voltage supply consists essentially of the battery BATT, which directly supplies the voltage Uu, the resistor R181, the diodes D181 and D182 and the transistor T181 which, in the circuit shown in FIG. 1, supply the stabilised voltage Vcc. The diode D182 is a light emitting diode and indicates the stand-by condition (sufficient battery voltage) of the transmitter.

The LF pulse generation takes place in the coding unit 200 by the microprocessor I101. The microprocessor I101 is a mask-programmed IC component with an ROM memory of 512 bytes which contains a non-variable programme for pulse generation.

The pulse sequence which logically corresponds to a sequence of the digits 0 and 1, is adjusted on the one hand via a coding bridge 220 and on the other via a so-called DIL (Dual In Line) switch 210. The DIL switch operates a diode matrix. By means of this DIL switch, the user can vary the emitted code to 10 bits. According to the position of the solder bridge (×150), however, the number of code bits may be 12 or 22. With the 22-bit code, 8 of the additional bits are at present preset at the factory. The 2 or 4 other bits of the code telegram can be varied by means of the coding bridge 220. By the aforementioned works set coding of 8 bits, however, in spite of the same position of the DIL switch, unintended operation of "foreign" appliances can be prevented if the works coding of the transmitters, which cannot be altered by the customer, is different.

The coding bridge 220 furthermore serves to fix the bits required to transmit desired functions.

On the downstream side of the LF pulse generator is a pulse shaper, the components of which start with the digits 14. This pulse shaper, essentially a Miller integrator, slopes off the pulse flanks to reduce the HF transmission band width. The output from the pulse shaper which is close to ground potential until saturation voltage is reached, is connected to the emitter of the output stage transistor T121 so that the maximum output limited by the working voltage is achieved.

The HF oscillator consists essentially of the oscillator circuit which is constituted by the coil L111 and the capacitors C112 and C113, and also the quartz resonator Q111 and the transistor T111. The resistors R112 and R113 serve for setting the bias and gain of the oscillator circuit. Together with the resultant oscillator circuit capacitance (consisting of L111, C112, C113), C114 constitutes the capacitance load of the quartz crystal Q111.

The output stage consists essentially of the transitor T121, the coil L124 and the resistor R121. R121 determines the bias of the transistor. L124 is the working resistor and compensates for the transistor collector capacitance. C124 and C141 serve only to block the high frequency. Following this output stage is a lowpass filter to Cauer parameters, which is built up from the capacitors C121, C122, C123, C128, C129 and the coils L121 and L122.

Together with the tapping point of the antenna coil, the capacitor C130 serves for optimum adaptation of the HF output to the antenna. The antenna oscillating circuit includes the trimming capacitor C127 and also the capacitors C125 and C126.

Figure 3:
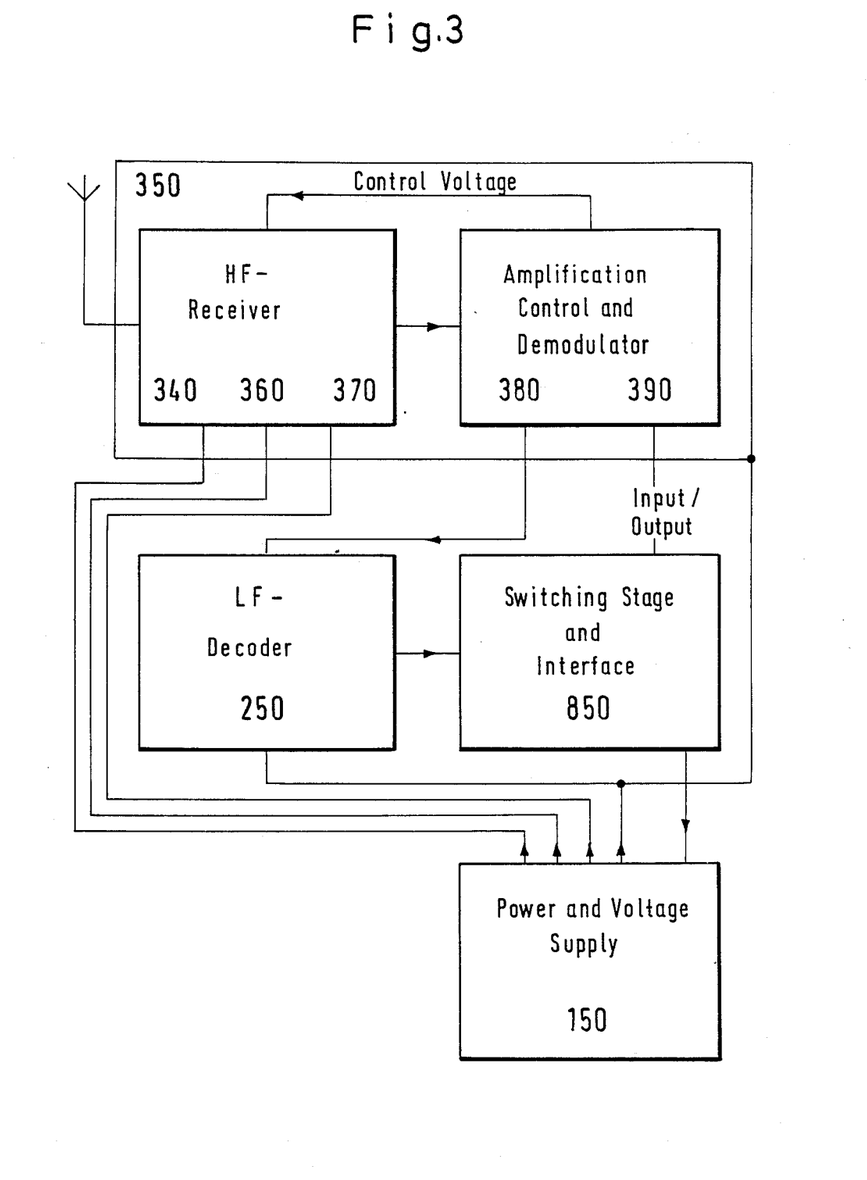
FIG. 3 is a block diagram of the receiver.

According to FIG. 3, the receiver consists essentially of a voltage supply, an integrated receiver with HF and IF amplifiers, a demodulator and an amplification control voltage generating arrangement, an LF decoder as well as a switching stage with a switching output.

Figure 4:
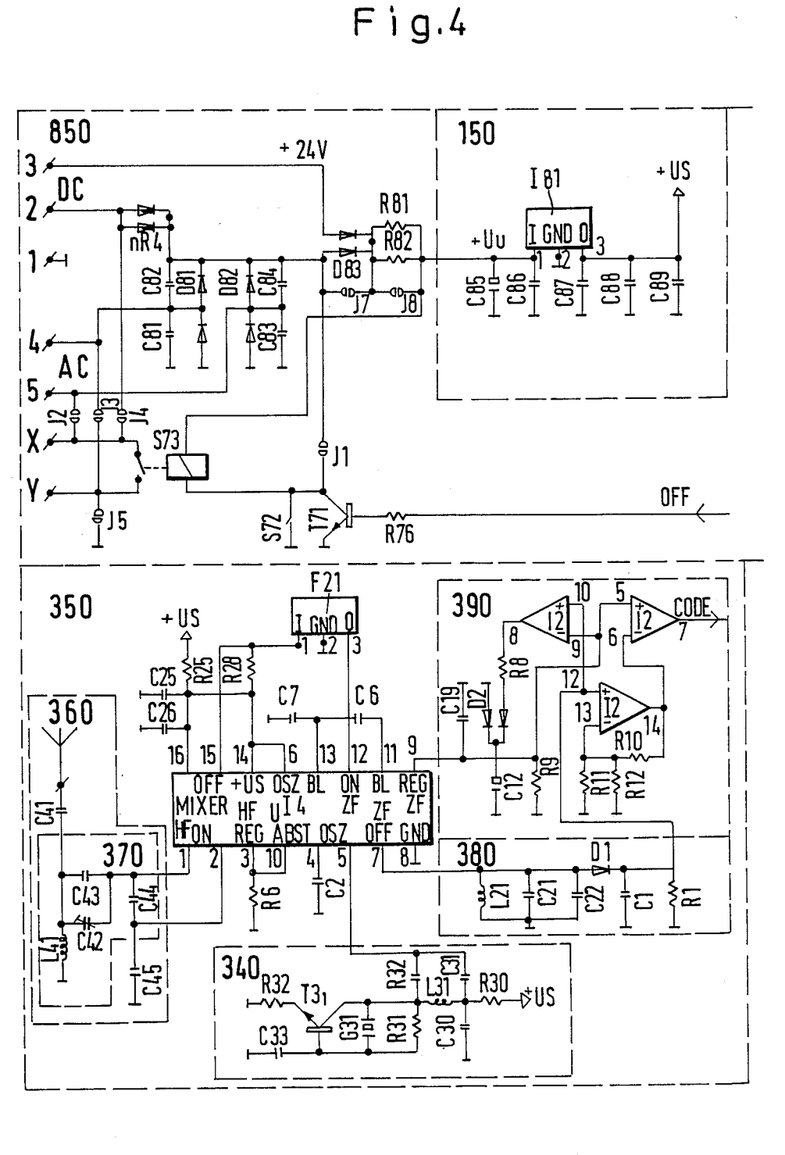
FIGS. 4 and 5 show the wiring diagram of the receiver.
Figure 5:
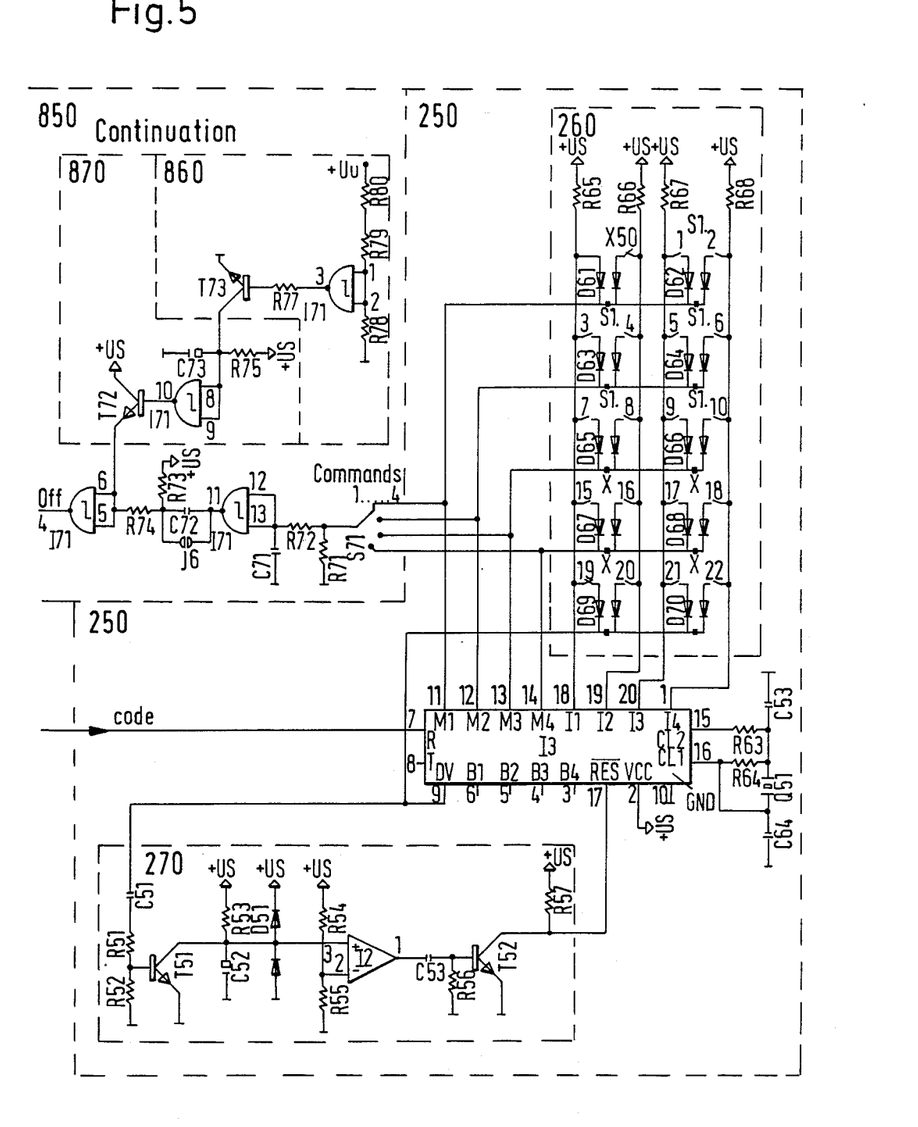

The circuitry can be seen in FIGS. 4 and 5. In conjunction with the appended parts list, complete information for a man skilled in the art can be found in the circuit diagrams in FIGS. 2, 4 and 5.

The particularity of the receiver circuit will be described in greater detail hereinafter. The oscillator circuit 370 of the antenna 360 consists of the coil L41 and the capacitors C42, C43 and C44, C42 being a trimmable capacitor by which the resonance frequency of the oscillator circuit an be tuned to the transmission frequency. Constituting the output of the antenna 360 is a capacitive divider consisting of the capacitors C42, C43 and C44. The capacitor C45 acts in respect of a high frequency in the same way as an earth connection so that the differential voltage falling above the capacitor C44 is applied to the high frequency input "HF IM" of the integrated receiver. The capacitive divider was used instead of the previously conventional transformer.

The working point of the mixer output is set by means of a resistor (R28) which preferably corresponds to the input impedance of the ceramic IF filter on the downstream side. The use of the resistor R28 instead of the otherwise conventional oscillator circuit will indeed increase signal distortion, but this is not found to be a disadvantage where transmission of the present digital code is concerned.

The oscillator, the components of which are identified by a two digit number beginning with 3, has exactly the same construction as the oscillator of the previously described transmitter. To avoid a further trimming point and technical advantages, this external additional oscillator is preferred instead of the internal oscillator of the frequency mixer. Demodulation of the pulse diagram occurs passively via D1, C1, R1. The voltage for setting the amplification of the integrated receiver is generated via an active peak value rectifier. The regulating conversion of the demodulated signal occurs after two-fold amplification by a part of the operational amplifier 12 which is connected as a comparator, to NMOS level for 13.

For decoding the IC component 13 is used which is of the same type as the IC component used in the coding unit but by virtue of the bridge $\times 50$, a fixed programme corresponding to the decoding is selected in its ROM memory.

Once again, the code word can be set by DIL switches in the diode matrix circuit, 10 bits being provided for the code to be set by the customer, while the other bits are adjusted at the factory.

The reset circuit 270, termed the "Watch Dog," consists of the components of which the two digit identifying numbers start with the digit 5.

As also in the case of the previously designated components, the identifying numbers are preceded by an R in the case of resistors, a C in the case of capcitors, an L in the case of coils, a T in the case of transistors, a D in the case of diodes, a Q in the case of quartz resonators and an I in the case of more complex components. A prefix S identifies switches while the prefix J indentifies soldered contacts.

The input/output adaptor circuit consists of components of which the two digit identifying numbers start with the digits 7 and 8, the capacitors C85 to C89, together with the component I81, forming a mains unit. The output circuit has in addition to the already-mentioned undervoltage recognition facility also what is referred to as a power-on-reset, which in the event of an interim power failure ensures that when the mains voltage returns, the output of the circuit remains in the inoperative condition.

The resistors R81 and R82 serve top limit current while the diodes D83, D84 constitute a reverse polarity protection for the direct current voltage output 2, 3. By bridging the contacts J1 to J5 and/or actuating the switches S72 and/or S73, upon receipt of a suitable signal, either the direct current voltage output 2, the alternating current voltage output 4, 5, or the potential free output X, Y will be operated, as desired.

Virtually all components are mounted on wafers in line with SMT (surface mounted technology), so that a very space-saving and handy construction is available both for transmitter and also for receiver.

The composition of transmitter and receiver can be seen in detail in the parts lists which are included as an appendix hereto. Where for adaptation of the output circuit to different appliances or garage door drives, the components are varied, then this can be ascertained from the headings in the parts list.

---

APPENDIX

HF Receiver with universal interface
429-871116

-continued

APPENDIX

Parts list

Key to types according to value-hyphen
C = chip (SMD)
F = melf
M = minimelf
R = radial
A = axial
K = ceramic capacitor
E = electrolytic capacitor
F = foil capacitor
N7 = N750 effect of temperature
NP = NPO effect of temperature
W50 = 0.5 W load capacity with resistors
V50 = 50 V voltage with capacitors
%1 = 1% tolerance Differing components for different fields of application:
(A) AC(/DC)-Input/Output, short-circuited by output pulse;
    connection to holes Nos. 4 and 5
(B) DC-Input, separate DC-Output for switching pulse;
    hole 1: GND, hole 2: switch output to GND. hole 3: +24 VDC
(C) 3-conductor AC(/DC)-Connection with relay switching contact;
    connection to holes 4, 5 and Y.
(D) 2-lead AC(/DC)-Connection short-circuiting via relay switching contact;
    connection to holes 4 and 5.
(E) AC- or DCOInput, potential free output;
    connection to holes 4, 5 or 1, 3 and X, Y.
(F) Combination of (A) and (B);
    connection to holes 1, 2, 3, 4 and 5.

Components table for above-mentioned applications (1=fitted, 0=not fitted):

| Alternative | J1 | J2 | J3 | J4 | J5 | J6 | J7 | J8 | S73 | C85 | C72 | Output signal |
|---|---|---|---|---|---|---|---|---|---|---|---|---|
| (A) | 1 | 0 | 0 | 0 | 0 | 0 | 0 | 0 | 0 | 1000y | 1 | Pulse |
| (B) | 1 | 0 | 0 | 0 | 0 | 1 | 0 | 0 | 0 | 1000y | 0 | Static |
| (C) | 0 | 0 | 1 | 0 | 0 | 1 | 0 | 0 | 1 | 1000y | 0 | Static |
| (D) | 0 | 1 | 1 | 0 | 0 | 1 | 1 | 0 | 1 | 2000y | 0 | Pulse length independent of Ub |
| (E) | 0 | 0 | 0 | 0 | 0 | 1 | 0 | 0 | 1 | 1000y | 0 | Static |
| (F) | 1 | 0 | 0 | 0 | 0 | 0 | 0 | 0 | 0 | 1000y | 1 | Pulse |

Varying equipment for different reception frequencies:

| Component | 27 MHz-band | 40 MHz-band | Remarks |
|---|---|---|---|
| Q 31 | 26 260 MHz | 40 230 MHz | 26.590 MHz USA |
| R 32 | 1k | 470 | Amplification setting T31 |
| C31 | 100 pF/NPO | 68 pF/NPO | |
| C32 | 22 pF/NPO | 15 pF/NPO | |
| C33 | 4p7/NPO | 4p7/NPO | Frequency setting Q31 |
| C41 | 3P3/NPO | 2p2/NPO | |
| C43 | 6p8/NPO | | |
| C44 | 100 pF/NPO | 68 pf/NPO | |
| L31 | 2.2 uH | 1.5 uH | |
| L41 | 2.2 uH | 1.5 uH | |

The values given in the above parts list are for the 27 MHz band:

| No. | Class | Type | Form | Pins | Remarks/number |
|---|---|---|---|---|---|
| | | | | Micro-CAD | Parts List B:p429-pat |
| 1 | C1 | 3N3-C | 0805 | 2 | |
| 2 | C2 | 10N-C | 0805 | 2 | |
| 3 | C6 | 100H-CZ5 | 0805 | 2 | |
| 4 | C7 | 100N-CZ5 | 0805 | 2 | |
| 5 | C12 | 10U-EC | 081A | 2 | |
| 6 | C19 | 10N-C | 0805 | 2 | |
| 7 | C21 | 100P-CNP | 0805 | 2 | |
| 8 | C22 | 10P-CNP | 0805 | 2 | |
| 9 | C25 | 100N-CZ5 | 0805 | 2 | |
| 10 | C26 | 100N-CZ5 | 0805 | 2 | |
| 11 | C30 | 10N-C | 0805 | 2 | |
| 12 | C31 | 100P-CNP | 0805 | 2 | |
| 13 | C32 | 22P-CNP | 0805 | 2 | |
| 14 | C33 | 4P7-CNP | 0805 | 2 | |
| 15 | C40 | 10H-ENTF | 0805 | 2 | |
| 16 | C41 | 3P3-CNP | 0805 | 2 | |
| 17 | C42 | 10P-TR-A | TR-C-S2A | 2 | |
| 18 | C43 | 6P8-CNP | 0805 | 2 | |
| 19 | C44 | 100P-CNP | 0805 | 2 | |
| 20 | C45 | 10N-C | 0805 | 2 | |
| 21 | C51 | 3N3-C | 0805 | 2 | |
| 22 | C52 | 1U-EC | BE1A | 2 | |
| 23 | C53 | 10N-C | 0805 | 2 | |
| 24 | C63 | 150P-CNP | 0805 | 2 | |
| 25 | C64 | 150P-CNP | 0805 | 2 | |
| 26 | C71 | 100N-C | 1210 | 2 | |

-continued

APPENDIX

| | | | | | |
|---|---|---|---|---|---|
| 27 | C72 | 100N-C | 1210 | 2 | |
| 28 | C73 | 1U-EC | BE1A | 2 | |
| 29 | C81 | 10N-C | 0805 | 2 | |
| 30 | C82 | 10N-C | 0805 | 2 | |
| 31 | C83 | 10N-C | 0805 | 2 | |
| 32 | C84 | 10N-C | 0805 | 2 | |
| 33 | C85 | 1000U-EA | 13B13 | 2 | |
| 34 | C86 | 100N-C | 1210 | 2 | |
| 35 | C87 | 100N-C | 1210 | 2 | |
| 36 | C88 | 10N-C | 0805 | 2 | |
| 37 | C89 | 100N-CZ5 | 0805 | 2 | |
| 38 | D1 | AA1118 | 4B2 | 2 | |
| 39 | D2 | BAV70-A4 | SOT-23 | 3 | |
| 40 | D51 | BAV99-A7 | SOT-23 | 3 | |
| 41 | D61 | BAV70-A4 | SOT-23 | 3 | |
| 42 | D62 | BAV70-A4 | SOT-23 | 3 | |
| 43 | D63 | BAV70-A4 | SOT-23 | 3 | |
| 44 | D64 | BAV70-A4 | SOT-23 | 3 | |
| 45 | D65 | BAV70-A4 | SOT-23 | 3 | |
| 46 | D66 | BAV70-A4 | SOT-23 | 3 | |
| 47 | D67 | A4-ENTF. | SOT-23 | 3 | |
| 48 | D68 | A4-ENTF. | SOT-23 | 3 | |
| 49 | D69 | BAV70-A4 | SOT-23 | 3 | |
| 50 | D70 | A4-ENTF. | SOT-23 | 3 | |
| 51 | D81 | BAV99-A7 | SOT-23 | 3 | |
| 52 | D82 | BAV99-A7 | SOT-23 | 3 | |
| 53 | D83 | BAV70-A4 | SOT-23 | 3 | |
| 54 | D84 | BAV70-A4 | SOT-23 | 3 | |
| 55 | F21 | PFBF455A | PFBF455 | 3 | |
| 56 | I1 | TCA440-R | DIL16REF | 16 | |
| 57 | I2 | 324-SO | SO-20W | 14 | |
| 58 | I3 | AL53201S | SO-20W | 28 | |
| 59 | I5 | 78L05-SO | SO-8 | 8 | |
| 60 | I17 | 4093-SO | SO-14 | 14 | |
| 61 | J1 | 000-C | 1206 | 2 | |
| 62 | J2 | 000-ENTF | 1206 | 2 | |
| 63 | J3 | 000-ENTF | 1206 | 2 | |
| 64 | J4 | 000-ENTF | 1206 | 2 | |
| 65 | J5 | 000-ENTF | 1206 | 2 | |
| 66 | J6 | 000-ENTF | 1206 | 2 | |
| 67 | J7 | 000-ENTF | 1206 | 2 | |
| 68 | J8 | 000-C | 1206 | 2 | |
| 69 | L21 | 1HH-C | LQN5N | 2 | |
| 70 | L31 | 2UH2-C | 1210 | 2 | |
| 71 | L41 | 2UH2-C | 1210 | 2 | |
| 72 | Q31 | 26H560RF | HC18REF | 4 | |
| 73 | Q61 | 424K | CSB-SMD | 2 | |
| 74 | R1 | 33K-C | 1206 | 2 | |
| 75 | R6 | 470-C | 1206 | 2 | |
| 76 | R8 | 33K-C | 1206 | 2 | |
| 77 | R9 | 100K-C | 1206 | 2 | |
| 78 | R10 | 10K-C | 1206 | 2 | |
| 79 | R11 | 10K-C | 1206 | 2 | |
| 80 | R12 | 33K-C | 1206 | 2 | |
| 81 | R25 | 10-C | 1206 | 2 | |
| 82 | R28 | 1K-C | 1206 | 2 | |
| 83 | R30 | 100-C | 1206 | 2 | |
| 84 | R31 | 330K-C | 1206 | 2 | |
| 85 | R32 | 1K-C | 1206 | 2 | |
| 86 | R40 | 1K-ENTF. | 1206 | 2 | |
| 87 | R41 | 10K-ENTF. | 1206 | 2 | |
| 88 | R51 | 100K-C | 1206 | 2 | |
| 89 | R52 | 100K-C | 1206 | 2 | |
| 90 | R53 | 1M-C | 1206 | 2 | |
| 91 | R54 | 10K-C | 1206 | 2 | |
| 92 | R55 | 33K-C | 1206 | 2 | |
| 93 | R56 | 100K-C | 1206 | 2 | |
| 94 | R57 | 3K3-C | 1206 | 2 | |
| 95 | R63 | 3K3-C | 1206 | 2 | |
| 96 | R64 | 1M-C | 1206 | 2 | |
| 97 | R65 | 100K-C | 1206 | 2 | |
| 98 | R66 | 100K-C | 1206 | 2 | |
| 99 | R67 | 100K-C | 1206 | 2 | |
| 100 | R68 | 100K-C | 1206 | 2 | |
| 101 | R71 | 1M-C | 1206 | 2 | |
| 102 | R72 | 330K-C | 1206 | 2 | |
| 103 | R73 | 1M-C | 1206 | 2 | |
| 104 | R74 | 1K-C | 1206 | 2 | |
| 105 | R75 | 680K-C | 1206 | 2 | |
| 106 | R76 | 1K-C | 1206 | 2 | |
| 107 | R77 | 33K-C | 1206 | 2 | |

-continued

APPENDIX

| | | | | | |
|---|---|---|---|---|---|
| 108 | R78 | 33K-C | 1206 | 2 | ---- |
| 109 | R79 | 33K-C | 1206 | 2 | ---- |
| 110 | R80 | 33K-C | 1206 | 2 | ---- |
| 111 | R81 | 100-F | MELF | 2 | ---- |
| 112 | R82 | 100-F | MFLF | 2 | ---- |
| 113 | S1 | DSP-10-R | DIL20SR+ | 20 | ---- |
| 114 | S71 | WW-LEIST | SL4/8 | 8 | ---- |
| 115 | S72 | SENSOR | TST180 | 4 | ---- |
| 116 | S73 | REL-E | REL-E | 6 | ---- |
| 117 | T31 | BC847-1F | SOT-23 | 3 | ---- |
| 118 | T51 | BC847-1F | SOT-23 | 3 | ---- |
| 119 | T52 | BC847-1F | SOT-23 | 3 | ---- |
| 120 | T71 | BC847-1F | SOT-23 | 3 | ---- |
| 121 | T72 | BC847-1F | SOT-23 | 3 | ---- |
| 122 | T73 | BC847-1F | SOT-23 | 3 | ---- |
| 123 | X15 | BRIDGE | LB2 | 2 | ---- |
| 124 | X16 | BRIDGE | LB2 | 2 | ---- |
| 125 | X17 | BRIDGE | LB2 | 2 | ---- |
| 126 | X18 | BRIDGE | LB2 | 2 | ---- |
| 127 | X19 | BRIDGE | LB2 | 2 | ---- |
| 128 | X20 | BRIDGE | LB2 | 2 | ---- |
| 129 | X21 | BRIDGE | LB2 | 2 | ---- |
| 130 | X22 | BRIDGE | LB2 | 2 | ---- |
| 131 | X50 | BRIDGE | LB2 | 2 | ---- |

SMD-Minitransmitter, 2 commands
SMD-Mini-hand-held transmitter, 2 commands
415-870209
Parts list

Key to types according to value-hyphen

C = chip
F = melf
M = minimelf
R = radial
A = axial
K = ceramic capacitor
E = electrolytic capacitor
F = foil capacitor
N7 = N750 effect of temperature
NP = NPO effect of temperature
W50 = 0.5 W load capacity with resistors
V50 = 50 V voltage with capacitors
%1 = 1% tolerance

Further components:

1 Wafer
1 Hand-held transmitter housing for 2 command version, complete
1 12 V battery
1 Antenna spring for reflow soldering IMPORTANT: Varying equipment for the following frequencies:

| Component | 27 MHz-band | 40 MHz-band | Remarks |
|---|---|---|---|
| Q 111 | 27.015 | 40.685 | 27.045 for USA |
| R 113 | 33OR | 33OR | Amplification setting T111 |
| C 112 | 47p-NPO | 33p-NPO | |
| C 113 | 22p-NPO | 15p-NPO | |
| C 114 | 4P7-NPO | 4p7-NPO | Frequency tuning Q111 |
| C 121 | 47p-NPO | 33P-NPO | |
| C 122 | 68p-NPO | 47p-NPO | |
| C 123 | 47p-NPO | 33p-NPO | |
| C 125 | 10p-NPO | 10p-NPO | |
| C 126 | 33p-N750 | 3p3-NPO | |
| C 128 | 2p2 | 2p2 | Do not fit, board capacitor |
| C 129 | 6p8 | 3p3 | Can be omitted, board capacitor |
| C 130 | 8p2-NPO | 4p7-NPO | |
| L 111 | 2.2 uH | 1.5 uH | |
| L 121 | 1 Uh | 680 nH | |
| L 122 | 1 uH | 680 nH | |
| L 124 | 2.2 uH | 1.5 uH | |

Values given below are for 27 MHz

| No. | Class | Type | Form | Pins | Remarks |
|---|---|---|---|---|---|
| 1 | | C111 | 10N-C | 0005 | 2 | |
| 2 | | C112 | 47P-CNP | 0005 | 2 | |
| 3 | | C113 | 22P-CNP | 0005 | 2 | |
| | | | | Micro-CAD | Parts list B:p415-pat |
| 4 | C114 | 4P7-CNP | 0805 | 2 | ---- |
| 5 | C121 | 47P-CNP | 0805 | 2 | ---- |
| 6 | C122 | 68P-CNP | 0805 | 2 | ---- |
| 7 | C123 | 47P-CNP | 0805 | 2 | ---- |
| 8 | C124 | 10N-C | 0805 | 2 | ---- |
| 9 | C125 | 10P-CNP | 0805 | 2 | ---- |

-continued
APPENDIX

| | | | | | |
|---|---|---|---|---|---|
| 10 | C126 | 33P-CN7 | 0805 | 2 | ---------------------------------- |
| 11 | C127 | 10P-TR-A | TR-C-S2A | 2 | ---------------------------------- |
| 12 | C128 | 2P2-PLAT | 0805 | 2 | ---------------------------------- |
| 13 | C129 | 6P8-ENTF | 0805 | 2 | ---------------------------------- |
| 14 | C138 | 10P-CNP | 0805 | 2 | ---------------------------------- |
| 15 | C141 | 10N-C | 0805 | 2 | ---------------------------------- |
| 16 | C142 | 22N-CNP | 1210 | 2 | ---------------------------------- |
| 17 | C151 | 150P-CNP | 0805 | 2 | ---------------------------------- |
| 18 | C152 | 150P-CNP | 0805 | 2 | ---------------------------------- |
| 19 | C153 | 10N-C | 0805 | 2 | ---------------------------------- |
| 20 | D161 | BAW56-A1 | SOT-23 | 3 | ---------------------------------- |
| 21 | D162 | BAV70-A4 | SOT-23 | 3 | ---------------------------------- |
| 22 | D163 | BAV70-A4 | SOT-23 | 3 | ---------------------------------- |
| 23 | D164 | BAV70-A4 | SOT-23 | 3 | ---------------------------------- |
| 24 | D165 | BAV70-A4 | SOT-23 | 3 | ---------------------------------- |
| 25 | D166 | BAV70-A4 | SOT-23 | 3 | ---------------------------------- |
| 26 | D181 | Z5V6-Z3 | SOT-23 | 3 | ---------------------------------- |
| 27 | D182 | LSS210 | SOT-23 | 3 | ---------------------------------- |
| 28 | I151 | AL532015 | SO-20W | 20 | ---------------------------------- |
| 29 | L111 | 2U2-C | 1210 | 2 | ---------------------------------- |
| 30 | L121 | 1U-C | 1210 | 2 | ---------------------------------- |
| 31 | L122 | 1U-C | 1210 | 2 | ---------------------------------- |
| 32 | L123 | FERANT | PA5X30R | 11 | ---------------------------------- |
| 33 | L124 | 2U2-C | 1210 | 2 | ---------------------------------- |
| 34 | Q111 | 27M015 | HC18LGR | 4 | ---------------------------------- |
| 35 | Q151 | 424K | CSB-SMD | 2 | ---------------------------------- |
| 36 | R111 | 100-C | 1206 | 2 | ---------------------------------- |
| 37 | R112 | 100K-C | 1206 | 2 | ---------------------------------- |
| 38 | R113 | 330-C | 1206 | 2 | ---------------------------------- |
| 39 | R121 | 33K-C | 1206 | 2 | ---------------------------------- |
| 40 | R141 | 1K-C | 1206 | 2 | ---------------------------------- |
| 41 | R142 | 3K3-C | 1206 | 2 | ---------------------------------- |
| 42 | R143 | 10K-C | 1206 | 2 | ---------------------------------- |
| 43 | R151 | 10K-C | 1206 | 2 | ---------------------------------- |
| 44 | R152 | 10K-C | 1206 | 2 | ---------------------------------- |
| 45 | R153 | 10K-C | 1206 | 2 | ---------------------------------- |
| 46 | R154 | 10K-C | 1206 | 2 | ---------------------------------- |
| 47 | R156 | 1M-C | 1206 | 2 | ---------------------------------- |
| 48 | R157 | 3K3-C | 1206 | 2 | ---------------------------------- |
| 49 | R161 | 100K-C | 1206 | 2 | ---------------------------------- |
| 50 | R162 | 100K-C | 1206 | 2 | ---------------------------------- |
| 51 | R163 | 100K-C | 1206 | 2 | ---------------------------------- |
| 52 | R164 | 100K-C | 1206 | 2 | ---------------------------------- |
| 53 | R181 | 1K-C | 1206 | 2 | ---------------------------------- |
| 54 | R182 | 1K-ENTF | 1206 | 2 | ---------------------------------- |
| 55 | S151 | TSTK02XE | TSTK02XS | 4 | ---------------------------------- |
| 56 | S152 | TSTK02XE | TSTK02XS | 4 | ---------------------------------- |
| 57 | S161 | DILS10 | DIL20SR | 20 | ---------------------------------- |
| 58 | T111 | BC847-1F | SOT-23 | 3 | ---------------------------------- |
| 59 | T121 | BSR14-U8 | SOT-23 | 3 | ---------------------------------- |
| 60 | T141 | BC847-1F | SOT-23 | 3 | ---------------------------------- |
| 61 | T142 | BC847-1F | SOT-23 | 3 | ---------------------------------- |
| 62 | T181 | BC847-1F | SOT-23 | 3 | ---------------------------------- |
| 63 | V181 | BKF-MINI | BKF-MINI | 3 | ---------------------------------- |
| 64 | V182 | BKF-MINI | BKF-MINI | 3 | ---------------------------------- |
| 65 | X111 | ENTF. | LB2 | 2 | ---------------------------------- |
| 66 | X119 | ENTF. | LB2 | 2 | ---------------------------------- |
| 67 | X143 | ENTF. | LB2 | 2 | ---------------------------------- |
| 68 | X150 | ENTF. | LB2 | 2 | ---------------------------------- |
| 69 | X151 | ENTF. | LB2 | 2 | ---------------------------------- |
| 70 | X152 | ENTF. | LB2 | 2 | ---------------------------------- |
| 71 | X153 | ENTF. | LB2 | 2 | ---------------------------------- |
| 72 | X154 | ENTF. | LB2 | 2 | ---------------------------------- |
| 73 | X155 | ENTF. | LB2 | 2 | ---------------------------------- |
| 74 | X156 | ENTF. | LB2 | 2 | ---------------------------------- |
| 75 | X157 | ENTF. | LB2 | 2 | ---------------------------------- |
| 76 | X158 | ENTF. | LB2 | 2 | ---------------------------------- |
| 77 | Z101 | CENT. HOLE | L02-5 | 1 | ---------------------------------- |
| 78 | Z102 | ENTF. | L02-5 | 1 | ---------------------------------- |
| | End | | | | |

I claim:

1. A hand-held transmitter for emitting coded electromagnetic pulses for reception and processing by a receiver tuned to said transmitter, preferably for the remote operation of garage doors, said transmitter comprising:

(a) a current/voltage supply having output means;
(b) a coded pulse generating coding unit with an adjustable code coupled to said output means of said current/voltage supply and having an output;
(c) a pulse shaper having an output and coupled to said output of said coding unit;

(d) an HF oscillator having an output and coupled to said current/voltage supply output means;

(e) an HF output stage having an output and coupled to said pulse shaper output and to said oscillator output;

(f) an antenna; and (g) a filter coupled between said HF output stage and said antenna;

wherein said HF oscillator comprises a circuit which enables a reliable oscillation build-up pattern in a relatively wide range of frequencies around a rated frequency, and said filter is a steeply-flanked low-pass filter.

2. A transmitter according to claim 1, wherein the HF oscillator can be operated in the range from ±10% of its rated frequency.

3. A transmitter according to claim 1, wherein the HF oscillator includes a quartz resonator, a transistor and an oscillator circuit comprising at least one capacitor and a coil.

4. A transmitter according to claim 1, wherein the antenna includes a trimming capacitor and in which the antenna is energised via a tapping.

5. A transmitter according to claim 1, wherein a capacitor is provided at the input of the antenna for impedance transformation.

6. A transmitter according to claim 1, wherein said output stage includes a transistor having a low potential terminal, said pulse shaper is a trapezoidal pulse shaper and its said output is connected to said low potential terminal of said output stage transistor.

7. A transmitter according to claim 1, wherein the low-pass filter has a flank steepness of at least 60 dB to the first harmonic.

8. A transmitter according to claim 1, wherein the coding unit comprises a microprocessor which has a selectable number of information bits selectively consisting of 12 or 22 bits.

9. A transmitter according to claim 8, wherein said coding unit includes a diode matrix circuit for setting a part of the code number.

10. A transmitter according to claim 8, wherein said coding unit further includes a coding bridge, said coding unit being adapted to trigger various functions which can be set via said coding bridge connected in the coding unit.

11. A transmitter according to claim 1, wherein the individual component elements are mounted on a wafer using the SMD (surface mounted device) technology.

12. A receiver for receiving coded electromagnetic pulses emitted by a transmitter according to claim 1, said receiver comprising:

(a) a current/voltage supply having output means;

(b) a high frequency receiver part having an output and coupled to said current/voltage supply output means and including:

(1) an HF antenna input circuit for receiving an incoming signal;

(2) an HF/IF amplifier and mixer part having output means and coupled to said receiver part ouput;

(3) an HF oscillator coupled to said amplifier and mixer part;

(4) a demodulator coupled to said output means of said amplifier and mixer part; and (5) a signal amplitude control circuit and level converter having an output and coupled to said output means of said amplifier and mixer part;

(c) a decoding unit with a code selector circuit having an output and coupled to said output of said control circuit and level converter; and (d) an input/output interface circuit coupled to said decoding unit output;

wherein the HF oscillator of the high frequency receiver part resonates in a wide frequency range and comprises a circuit which enables a reliable oscillation build-up pattern in a relatively wide range of frequencies around the rated frequency, and wherein the HF antenna circuit further comprises an antenna oscillator circuit which has a trimming capacitor, and wherein the incoming signal is output from the antenna oscillator circuit through a capacitive divider, the divider being taken to earth on the HF side of the antenna oscillator circuit via a capacitor.

13. A receiver according to claim 12, wherein a non-trimmable wide band pass filter is connected in the high frequency receiver part between the signal output from the HF/IF amplifier and mixer part and the demodulator.

14. A receiver according to claim 12, wherein the high frequency receiver part further includes a ceramic IF filter and a resistor connected between the output of the mixer part and the ceramic IF filter to adjust the working point of the HF/IF amplifier and mixer part.

15. A receiver according to claim 12, wherein the decoding unit comprises a microprocessor with an adjustable code.

16. A receiver according to claim 15, wherein the decoding unit further comprises a diode matrix circuit for adjusting the code.

17. A receiver according to claim 15, wherein the microprocessor is connected to a reset circuit for automatically restoring the decoding unit to normal operating condition in the event of interference pulses or programming errors.

18. A receiver according to claim 12, wherein the input/output circuit incorporates low voltage recognition means to detect low voltage output from the receiver.

19. A receiver according to claim 12, wherein the input/output circuit contains a power-on reset circuit.

20. A receiver according to claim 12, wherein the input/output circuit is constructed as an adaptor circuit including internal soldered bridges which are selectively bridges so that the adaptor circuit can function selectively as an alternating current input/output, a direct current input/output and as a potential free output in conjunction with the direct current or alternating current input.

21. A receiver according to claim 12, wherein the input/output circuit includes means for providing current limitation, means to provide reverse polarity protection for direct current outputs and also means to provide pulse duration limitation.

22. A receiver according to claim 12, wherein the individual component elements are mounted on a wafer using SMD technology.

23. A transmitter according to claim 1, and further comprising fixed capacitive means coupling the HF oscillator to the HF output stage.

24. A method for coding electromagnetic transmission pulses comprising the steps of:
providing a supply of current/voltage to a code generator, to an HF oscillator and to an HF output stage;

generating coded electromagnetic pulses with an adjustable code wherein by a time-based tripartition of the bit information of the transmitted code (pulse telegram), the proposition concerning logical significance ensues in accordance with the following precept, in that after a flank fall from high to low and a subsequent flank rise from low to high after one-third of the transmission preset for one bit, a logic zero is transmitted, but upon a subsequent flank rise from low to high after two-thirds of the transmission time preset for one bit, a logic one is transmitted, wherein a pulse telegram 26 bits long is used, consisting of a 22 bit information part followed by a synchronizing pause 4 bits long, consisting of a low signal and a flank transition from low to high after the second third of the fourth pause bit;

shaping the generated pulses;

applying the shaped pulses to an HF output stage to provide an output signal;

providing HF oscillations to the HF output stage;

filtering the output signals from the HF output stage; and then applying the filtered signals to an antenna for transmission therefrom;

the HF oscillator enables a reliable build-up pattern in a relatively wide range of frequencies around the rated frequency, the filter is a steeply-flanked low-pass filter connected between the HF output stage and the antenna.

* * * * *